United States Patent
Ha et al.

(10) Patent No.: US 7,638,237 B2
(45) Date of Patent: *Dec. 29, 2009

(54) TERMINAL-LINKING MEMBER OF SECONDARY BATTERY MODULE

(75) Inventors: Jin Woong Ha, Cheonan-si (KR); Jeeho Kim, Daejeon (KR); HanHo Lee, Yongin-si (KR)

(73) Assignee: LG Chem, Ltd. (KR)

( * ) Notice: Subject to any disclaimer, the term of this patent is extended or adjusted under 35 U.S.C. 154(b) by 776 days.

This patent is subject to a terminal disclaimer.

(21) Appl. No.: 11/317,872

(22) Filed: Dec. 23, 2005

(65) Prior Publication Data

US 2006/0194101 A1  Aug. 31, 2006

(30) Foreign Application Priority Data

Dec. 24, 2004  (KR)  ............. 10-2004-0112590

(51) Int. Cl.
*H01M 6/46* (2006.01)
*H01M 2/24* (2006.01)
*H01M 2/26* (2006.01)
*H01R 24/00* (2006.01)
*H01R 33/00* (2006.01)

(52) U.S. Cl. .............. 429/152; 429/158; 429/160; 429/161; 439/627

(58) Field of Classification Search .......... 429/152, 429/158, 160, 161; 439/627
See application file for complete search history.

(56) References Cited

U.S. PATENT DOCUMENTS

| 4,047,239 | A * | 9/1977 | Waterman et al. ........... 361/270 |
| 2001/0022926 | A1* | 9/2001 | Kitayama et al. ........... 411/531 |
| 2001/0046615 | A1* | 11/2001 | Osaki et al. ................. 429/7 |
| 2005/0123828 | A1* | 6/2005 | Oogami et al. .............. 429/152 |

* cited by examiner

*Primary Examiner*—Patrick Ryan
*Assistant Examiner*—Eugenia Wang
(74) *Attorney, Agent, or Firm*—Cantor Colburn LLP

(57) ABSTRACT

Disclosed herein is a terminal-linking member of a high-output, large-capacity secondary battery module or pack having a plurality of unit cells stacked one on another and electrically connected with each other. The terminal-linking member includes an insulating member mounted between electrode terminals of the neighboring unit cells for accomplishing the electrical insulation between the electrode terminals, the insulating member being coupled to the electrode terminals, and a connecting member coupled to the insulating member for electrically connecting the electrode terminals of the unit cells coupled to the insulating member in series or in parallel with each other.

13 Claims, 5 Drawing Sheets

TERMINAL-LINKING MEMBER OF SECONDARY BATTERY MODULE

FIELD OF THE INVENTION

The present invention relates to a terminal-linking member of a high-output, large-capacity secondary battery module or pack having a plurality of unit cells stacked one on another and electrically connected with each other, and, more particularly, to a terminal-linking member including an insulating member mounted between electrode terminals of the neighboring unit cells for accomplishing the electrical insulation between the electrode terminals, the insulating member being coupled to the electrode terminals, and a connecting member coupled to the insulating member for electrically connecting the electrode terminals of the unit cells coupled to the insulating member in series or in parallel with each other.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel. As a result, kinds of applications using the secondary battery are being increased owing to advantages of the secondary battery, and hereafter the secondary battery is expected to be applied to more applications and products than now.

Secondary batteries have different structures depending upon outputs and capacities required by applications and products, to which the secondary batteries are applied. For example, small-sized mobile devices, such as mobile phones, personal digital assistants (PDAs), digital cameras, and laptop computers, use one or several small-sized, light cells for each device according to the reduction in size and weight of the corresponding products. On the other hand, medium- or large-sized devices, such as electric bicycles, electric motorcycles, electric vehicles, and hybrid electric vehicles, use a battery module (or battery pack) having a plurality of cells electrically connected with each other because high output and large capacity is necessary for the medium- or large-sized devices. The size and weight of the battery module is directly related to the receiving space and output of the corresponding medium- or large-sized device. For this reason, manufacturers are trying to manufacture small-sized, light battery modules. Furthermore, devices, which are subject to a large number of external impacts and vibrations, such as electric bicycles and electric vehicles, require stable electrical connection and physical connection between components constituting the battery module. In addition, a plurality of cells are used to accomplish high output and large capacity, and therefore, the safety of the battery module is regarded as important.

Generally, a medium- or large-sized secondary battery module is manufactured by mounting a plurality of unit cells in a case (housing) having a predetermined size and electrically connecting the unit cells. A rectangular secondary cell or a pouch-shaped secondary cell, which can be stacked with high integration, is used as the unit cell. Preferably, the pouch-shaped cell is normally used as the unit cell, since the pouch-shaped cell is light and inexpensive.

However, the pouch-shaped cell, which is normally used as the unit cell of the battery module, has several problems in spite of the above-mentioned advantages.

First, the pouch-shaped cell has plate-shaped electrode terminals, which protrude from the upper end of the pouch-shaped cell. As a result, it is difficult to electrically connect the plate-shaped electrode terminals of the pouch-shaped cell, which is necessary to construct the battery module. Generally, the electrode terminals are connected with each other using wires, plates, or bus bars by welding. However, this electrical connection is difficult for the plate-shaped electrode terminals. For this reason, the plate-shaped electrode terminals are partially bent, and the plates or the bus bars are connected to the bent parts of the plate-shaped electrode terminals by welding, which requires skilled techniques. Also, this connecting process is very complicated. In addition, the connected parts may separate from each other due to external impacts, which results in increase in the number of defective products.

Secondly, the pouch-shaped cell has low mechanical strength. For this reason, additional members for maintaining stable connection and assembly are needed when a plurality of unit cells are stacked to manufacture a battery module. Consequently, when the battery module is manufactured using the pouch-shaped cells, unit cells are mounted in a cartridge, which is capable of receiving one or two unit cells, and a plurality of cartridges are stacked one on another so as to manufacture a battery module. As a result, a manufacturing process of the battery module is further complicated, and the size of the battery module is increased.

SUMMARY OF THE INVENTION

Accordingly, it is an object of the present invention to substantially obviate the above-mentioned problems of the conventional arts as well as the technical problems requested from the past.

A primary object of the present invention is to provide a terminal-linking member that is capable of stably connecting electrode terminals of unit cells in a battery module by a simple process.

Another object of the present invention is to provide a terminal-linking member that is capable of securely stacking unit cells to construct a battery module without using additional mounting members, such as cartridges.

Yet another object of the present invention is to provide a terminal-linking member that is capable of reducing a possibility of short circuits during manufacturing the battery module, enabling a safety element to be easily mounted during the assembly of the battery module or during the use of the completed battery module, and performing a leveling process to the unit cells.

In accordance with one aspect of the present invention, the above and other objects can be accomplished by the provision of a terminal-linking member of a secondary battery module having unit cells stacked one on another and electrically connected with each other, wherein the terminal-linking member comprises: an insulating member mounted between electrode terminals of the neighboring unit cells for accomplishing the electrical insulation between the electrode terminals, the insulating member being coupled to the electrode terminals; and a connecting member coupled to the insulating member for electrically connecting the electrode terminals of the unit cells coupled to the insulating member in series and/or in parallel with each other.

According to the present invention, the secondary battery module is manufactured by sequentially assembling the insulating member and the connecting member. Consequently, a manufacturing process of the battery module is very simple while excellent coupling force and safety is provided.

The electrode terminals may be constructed such that the cathode terminal and the anode terminal are formed at one side of each cell, or the cathode terminal is formed at one side of each cell while the anode terminal is formed at the other side of each cell. For example, the cathode terminal and the anode terminal may be formed at the upper end and the lower end of each cell, respectively, such that the cathode terminal and the anode terminal are opposite to each other.

The insulating member serves to electrically insulate the electrode terminals of the neighboring unit cells from each other. Consequently, the insulating member is made of an electrically insulating material. Preferably, the insulating member is made of various plastic resins, although the insulating member is not particularly restricted so long as the insulating member electrically insulates the electrode terminals of the neighboring unit cells from each other.

The insulating member may be coupled with the electrode terminals of the unit cells in various manners. In a preferred embodiment of the present invention, the electrode terminals of the unit cells are provided with through-holes, and the insulating member is provided with coupling protrusions, which correspond to the through-holes. Consequently, the coupling protrusions of the insulating member are fitted in the through-holes of the electrode terminals, and therefore, the secure coupling between the insulating member and the electrode terminals is accomplished. Preferably, the coupling protrusions are also provided with through-holes, such that the stacked electrode terminals, more specifically, the electrode terminals stacked while the insulating member is disposed between the electrode terminals, are further securely coupled with each other by coupling members inserted through the through-holes of the coupling protrusions.

In a preferred embodiment of the present invention, the insulating member is constructed in the shape of a rectangular block, which conforms to a gap between the electrode terminals of the stacked unit cells. The gap between the electrode terminals, while the unit cells are stacked, is provided in the shape of a rectangle. Consequently, the rectangular block confirming to the gap is more stable.

More preferably, the block comprises two assembly unit bodies constructed such that the assembly unit bodies can be coupled with or separated from each other, a cathode terminal of the unit cell being coupled to one of the assembly unit bodies while an anode terminal of the unit cell is coupled to the other assembly unit body.

The connecting member, which is the other component constituting the terminal-linking member according to the present invention, is coupled to the insulating member, as described above, and serves to electrically connect the electrode terminals of the unit cells, which are also coupled to the insulating member. For this reason, the connecting member is made of a conductive material. Preferably, the connecting member is made of metal, although the connecting member is not particularly restricted so long as the connecting member electrically connects the electrode terminals with each other.

The coupling between the connecting member and the insulating member may be accomplished in various manners. In a preferred embodiment of the present invention, the connecting member comprises: a first terminal connecting body connected to the electrode terminal (a) of the unit cell (A); and a second terminal connecting body connected to the electrode terminal (b) of the unit cell (B) adjacent to the unit cell (A). The connecting member may be coupled to the insulating member in such a manner that the connecting member surrounds the insulating member, or the connecting member may be inserted into hollow parts formed at the insulating member. When the electrode terminal (a) of the unit cell (A) connected to the connecting member is different from the electrode terminal (b) of the unit cell (B) connected to the connecting member, the electrode terminals are connected in series with each other. When the electrode terminal (a) of the unit cell (A) connected to the connecting member is identical to the electrode terminal (b) of the unit cell (B) connected to the connecting member, on the other hand, the electrode terminals are connected in parallel with each other.

More preferably, the first terminal connecting body and the second terminal connecting body are separated from each other, the first terminal connecting body and the second terminal connecting body are coupled to the insulating member such that the first and second terminal connecting bodies are connected to the corresponding electrode terminals, and the first terminal connecting body and the second terminal connecting body are connected with each other by a conductive member for accomplishing the electrical connection between the first terminal connecting body and the second terminal connecting body after the first and second terminal connecting bodies are coupled to the insulating member. Preferably, the conductive member is a safety element, such as a fuse, a bimetal, or a positive temperature coefficient (PTC) element.

When the above-described separation-type connecting member is used during the assembly of the battery module, a possibility of short circuits is greatly reduced, since the electrodes are not electrically connected with each other by the connecting member. Furthermore, the safety element can be easily connected during the assembly of the battery module or during the use of the completed battery module, and it is possible to perform a parallel leveling process for leveling the initial state of the unit cells.

In accordance with another aspect of the present invention, there is provided a secondary battery module including the terminal-linking member as described above.

In a preferred embodiment of the present invention, the battery module comprises: a plate, on which a plurality of unit cells, which are chargeable and dischargeable secondary cells, are stacked one on another; and circuit units for controlling the operation of the battery.

The plate is not particularly restricted so long as the plate has a structure in which the unit cells can be stacked one on another. The plate may be a case having a receiving part corresponding to the size of the unit cells such that the unit cells can be easily mounted in the receiving part. The case may be constructed in a separated structure in which the upper and lower parts of the stacked unit cells are covered by the case.

A preferred example of secondary battery module is illustrated in FIG. 1.

BRIEF DESCRIPTION OF THE DRAWINGS

The above and other objects, features and other advantages of the present invention will be more clearly understood from the following detailed description taken in conjunction with the accompanying drawings, in which.

Figure 1:
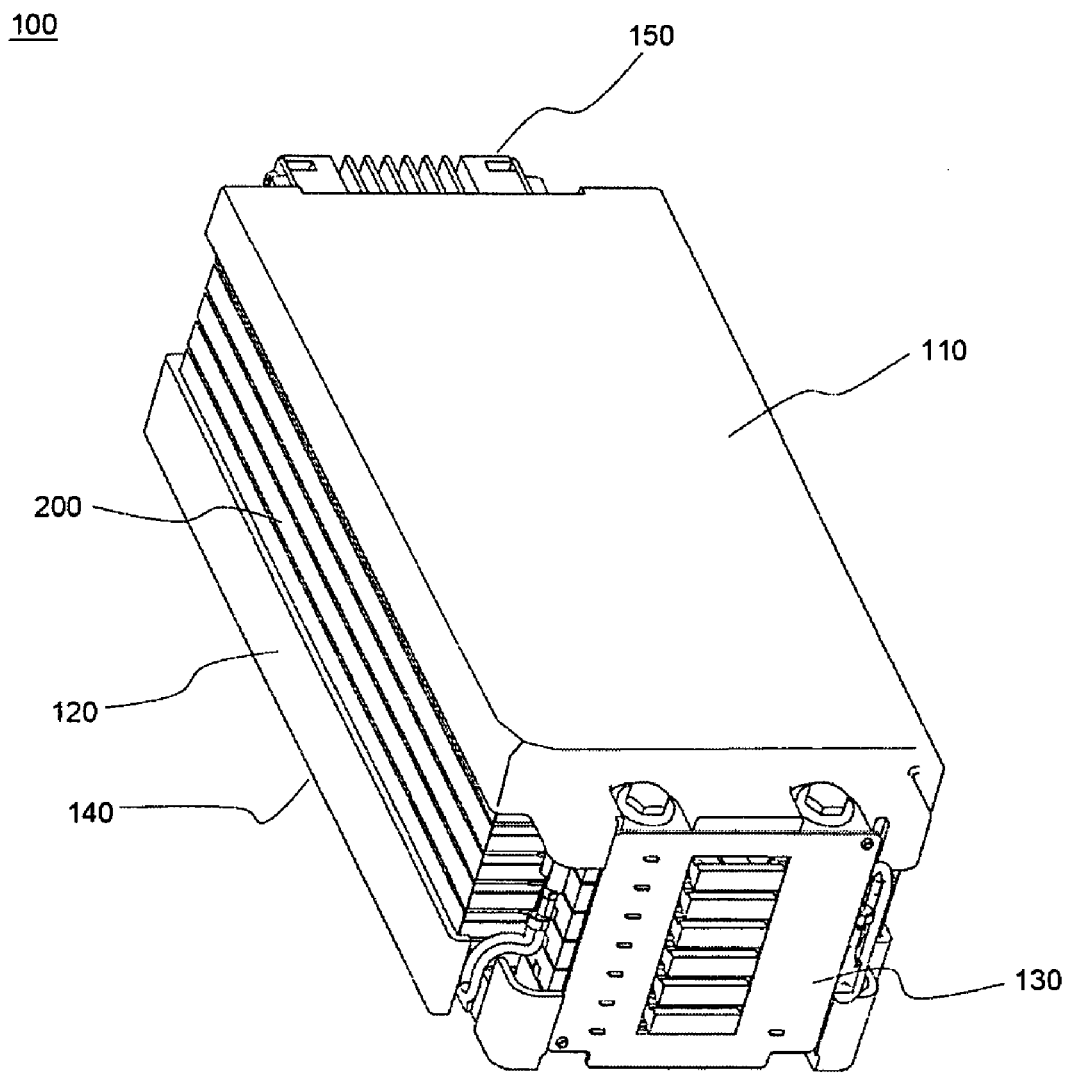
FIG. 1 is a perspective view illustrating a secondary battery module, to which a terminal-linking member according to a preferred embodiment of the present invention is applied.

<Description of Main Reference Numerals of the Drawings>

| | |
|---|---|
| 100: battery module | 200: unit cells |
| 300: insulating member | 400: connecting member |
| 500: fastener | 600: double-sided adhesive tapes |
| 700: fuse | |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

FIG. 1 is a typical perspective view illustrating a secondary battery module 100, to which a terminal-linking member according to a preferred embodiment of the present invention is applied.

Referring to FIG. 1, the battery module 100 includes an upper case 110, a lower case 120, a plurality of unit cells 200, a first circuit unit 130, a second circuit unit 140, and a third circuit unit 150. The unit cells 200 are stacked between the upper case 110 and the lower case 120, which are separated from each other. The first circuit unit 130 is mounted at the front surface of the battery module 100, the second circuit unit 140 is mounted at the lower surface of the battery module 100, and the third circuit unit 150 is mounted at the rear surface of the battery module 100.

Since the upper case 110 and the lower case 120 are separated from each other, the number of the unit cells 200, which are stackable one on another, is not limited by the upper case 110 and the lower case 120. Consequently, it is possible to easily design the battery module 100, such that the battery module 100 has desired electrical capacity and output, by modifying the first circuit unit 130 and the third circuit unit 150 depending upon the number of the stacked unit cells 200. Also, the unit cells 200 are exposed, and therefore, heat dissipation is efficiently accomplished while the unit cells 200 are charged or discharged. According to circumstances, the upper case 110 may be omitted.

The first circuit unit 130 is mounted at one side surface of the battery module 100 adjacent to electrode terminals of the unit cells 200, and the first circuit unit 130 includes a connecting member according to the present invention for connecting the unit cells 200 in parallel or in series with each other and a sensing board assembly for sensing voltage and/or current signals of the respective unit cells 200.

The second circuit unit 140 is electrically connected to the first circuit unit 130, and the second circuit unit 140 includes a main board assembly for controlling the battery module 100. The main board assembly is mounted in a lower receiving part of the lower case 120. The temperature of the battery may be sensed by the main board assembly.

The third circuit unit 150 is electrically connected to the second circuit unit 140. Also, the third circuit unit 150 is connected to an external input/output terminal while preventing overcurrent during charging and discharging electricity. The third circuit unit 150 is mounted at the other side surface of the battery module 100 such that the third circuit unit 150 is opposite to the first circuit unit 130.

According to circumstances, the first circuit unit 130, the second circuit unit 140, and the third circuit unit 150 may be partially or wholly constructed in a combined structure. Also, these circuit units 130, 140, and 150 may be partially or wholly mounted at the same position of the battery module, i.e., one or two surfaces of the battery module. These constructions of the circuit units must be interpreted to be within the scope of the present invention.

Figure 2:
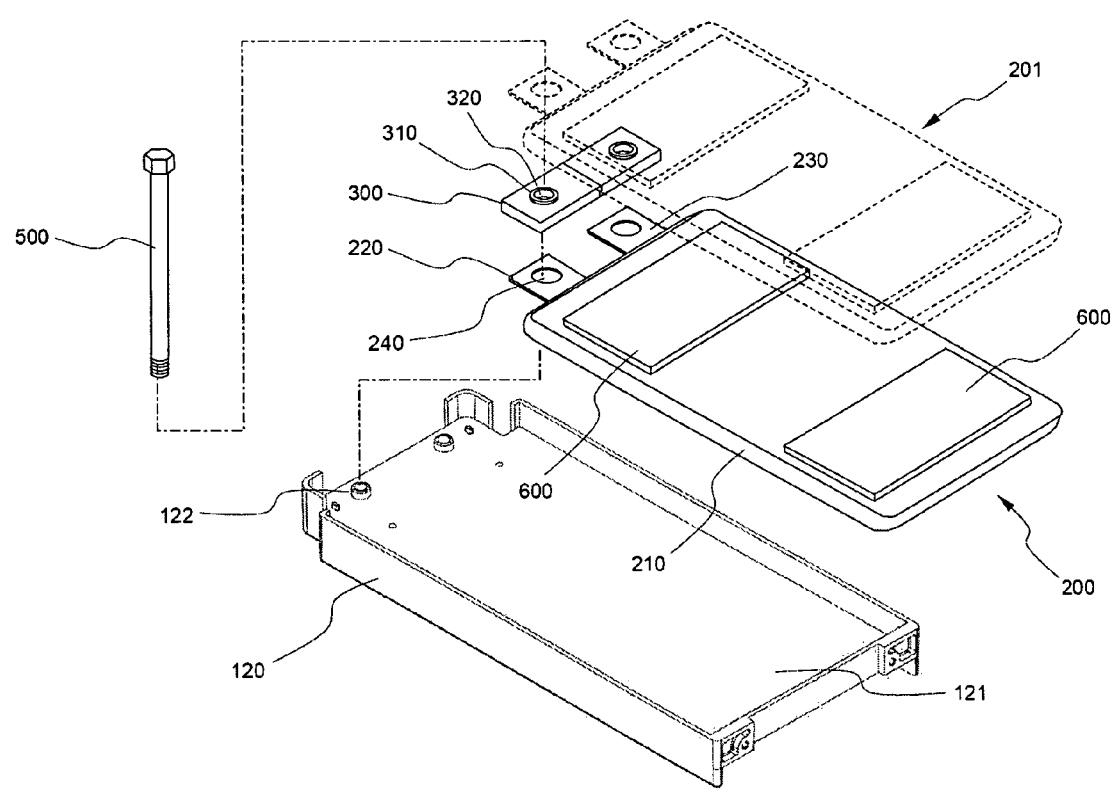
FIG. 2 is a typical view illustrating stacking of unit cells on a lower case of the battery module shown in FIG. 1.

FIG. 2 is a perspective view illustrating stacking of the unit cells on the lower case of the battery module shown in FIG. 1.

Referring to FIG. 2, the lower case 120 is a rectangular structure almost corresponding to the outer appearance of the unit cell 200. The lower case 120 includes an upper receiving part 121, in which the unit cell 200 is received. According to circumstances, the lower case 120 may be a simple plate structure. Preferably, the lower case 120 is made of a plastic resin, such as acrylonitrile-butadiene-styrene (ABS), polycarbonate (PC), or polybutylene terephthalate (PBT), which has high strength and electrical insulation.

The unit cell 200 stacked on the lower case 120 is a pouch-shaped secondary cell, which has a cathode terminal 220 and an anode terminal 230 protruding from the upper end of a cell body 210. At the electrode terminals 220 and 230 are formed through-holes 240, respectively. Additional fixing members, for example, fasteners 500, are inserted through the through-holes 240 and fixing holes 122 formed in the lower case 120, while the unit cells 200 and 201 are stacked, and then nuts (not shown) are fitted on the fasteners 500 at the lower surface of the lower case 120. Consequently, the unit cells 200 and 201 are fixed to each other.

Between the electrode terminals 220 and 230 of the unit cells 200 and the electrode terminals 220 and 230 of the unit cells 201 are mounted an insulating member 300 for accomplishing the electrical insulation between the unit cells 200 and 201. At the insulating member 300 are formed protrusions 310, which are fitted in the through-holes 240 of the electrode terminals 220 and 230. At the protrusions 310 are also formed through-holes 320, and therefore, the electrical insulation between the fasteners 500 inserted through the through holes 320 of the protrusions 310 and the electrode terminals 220 and 230 is maintained.

Also, double-sided adhesive tapes 600 are attached to the cell body 210 of the unit cell 200, whereby more stable coupling between the stacked unit cells 200 and 201 is guaranteed. Furthermore, the stacked unit cells 200 and 201 are spaced apart from each other by the thickness of the double-sided adhesive tapes 600. The gap between the stacked unit cells 200 and 201 serves to absorb the change in volume of the unit cells 200 and 201 while the unit cells 200 and 201 are charged or discharged and to effectively dissipate heat generated from the unit cells 200 and 201 while the unit cells 200 and 201 are charged or discharged.

Figure 3:
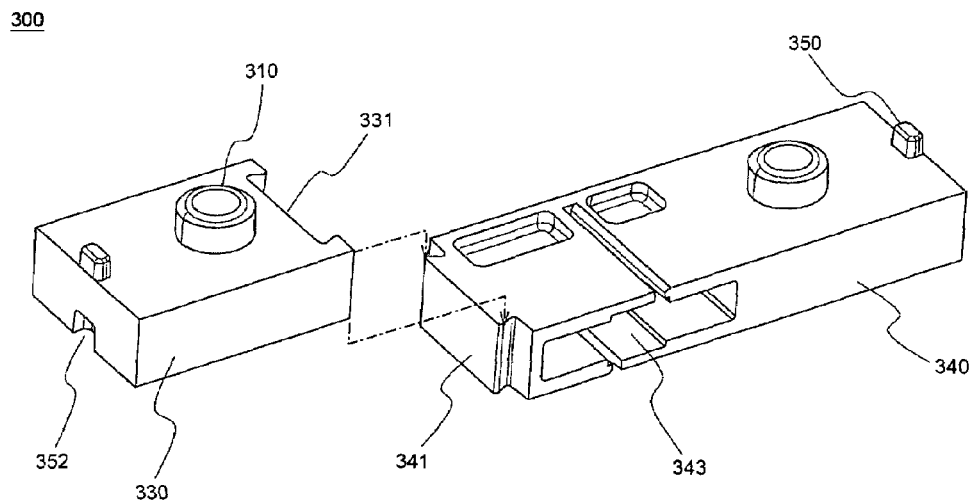
FIG. 3 is a typical view illustrating an assembly-type insulating member according to a preferred embodiment of the present invention, which is one part of the terminal-linking member, before assembly of the insulating member.

FIG. 3 is a typical view illustrating an assembly-type insulating member 300 according to a preferred embodiment of the present invention before assembly of the insulating member.

Referring to FIG. 3, the insulating member 300 comprises: a first assembly unit body 330 having a female coupling part 331 formed at one side thereof; and a second assembly unit body 340 having a male coupling part 341 formed at one side thereof such that the male coupling part 341 corresponds to the female coupling part 331. The first assembly unit body 330 and the second assembly unit body 340 are coupled with or separated from each other. The insulating member 300 is constructed in the shape of a rectangular block when the first assembly unit body 330 and the second assembly unit body 340 are coupled with each other.

At the outside parts of the upper ends of the respective assembly unit bodies 330 and 340 are formed coupling protrusions 350, by which the assembly unit bodies 330 and 340 are coupled with another insulating member (not shown) stacked on the assembly unit bodies 330 and 340. At the lower end surfaces of the assembly unit bodies 330 and 340 are formed coupling grooves 352, which correspond to the coupling protrusions 350. Also, the protrusions 310 are formed at the middle parts of the upper ends of the respective assembly unit bodies 330 and 340 such that the protrusions 310 are fitted in the through-holes (not shown) of the electrode terminals of the unit cell, as shown in FIG. 2.

At the side of the second assembly unit body 340 is formed a hollow part 343, by which a connecting member (not shown) is coupled with the insulating member 300 constructed by coupling the first assembly unit body 330 and the second assembly unit body 340.

Figure 4:
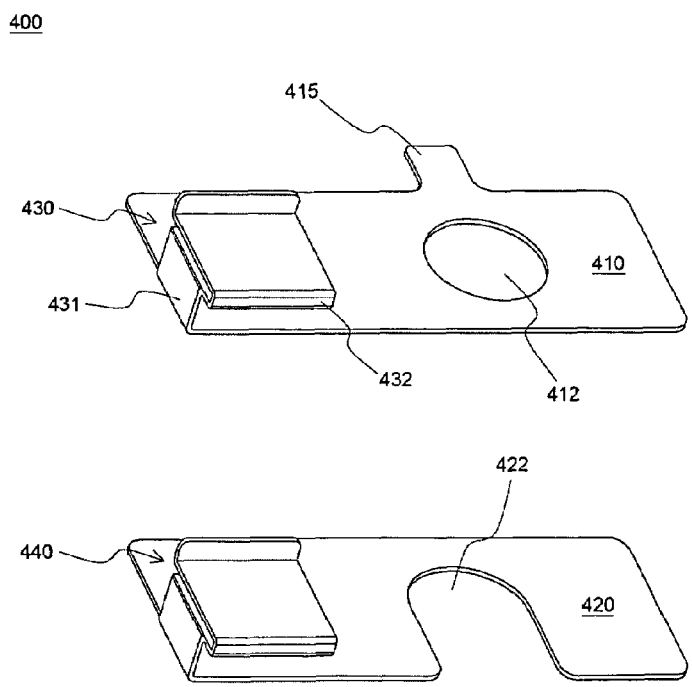
FIG. 4 is a typical view illustrating a separation-type connecting member according to a preferred embodiment of the present invention, which is the other part of the terminal-linking member.

FIG. 4 is a typical view illustrating a separation-type connecting member 400 according to a preferred embodiment of the present invention.

Referring to FIG. 4, the separation-type connecting member 400 comprises: a first terminal connecting body 410, which is connected to one of the electrode terminals of the unit cell (for example, the cathode terminal); and a second terminal connecting body 420, which is connected to the other electrode terminal of the unit cell (for example, the anode terminal). The terminal connecting bodies 410 and 420 are made of a conductive material and formed in the shape of a plate. At the respective terminal connecting bodies 410 and 420 are formed engaging holes 412 and 422, in which the protrusions 310 of the insulating member (see FIG. 3) are fitted. The engaging hole 412 formed at the first terminal connecting body 410 is constructed in a closed type such that the corresponding protrusion of the insulating member is fitted into the engaging hole 412 of the first terminal connecting body 410 only from above. On the other hand, the engaging hole 422 formed at the second terminal connecting body 420 is constructed in an open type such that the corresponding protrusion of the insulating member is fitted into the engaging hole 422 of the second terminal connecting body 410 from both above and side. A process of assembling the insulating member and the connecting member will be described hereinafter with reference to FIG. 5.

At the first terminal connecting body 410 is formed a connecting extension part 415, which protrudes from the side thereof such that the connecting extension part 415 can be connected to the sensing board assembly in the assembled state.

At the respective terminal connecting bodies 410 and 420 are formed engaging parts 430 and 440, respectively, which are securely inserted into the hollow part 343 of the insulating member (see FIG. 3). Each of the engaging parts 430 and 440 includes a first bent section 431 formed by bending inwardly a main body, which is made of a plate-shaped material, at a predetermined height and a second bent section 432 formed by vertically bending the first bent section 431. Consequently, the engaging parts 430 and 440 can be elastically engaged in the hollow part of the insulating member.

Figure 5:
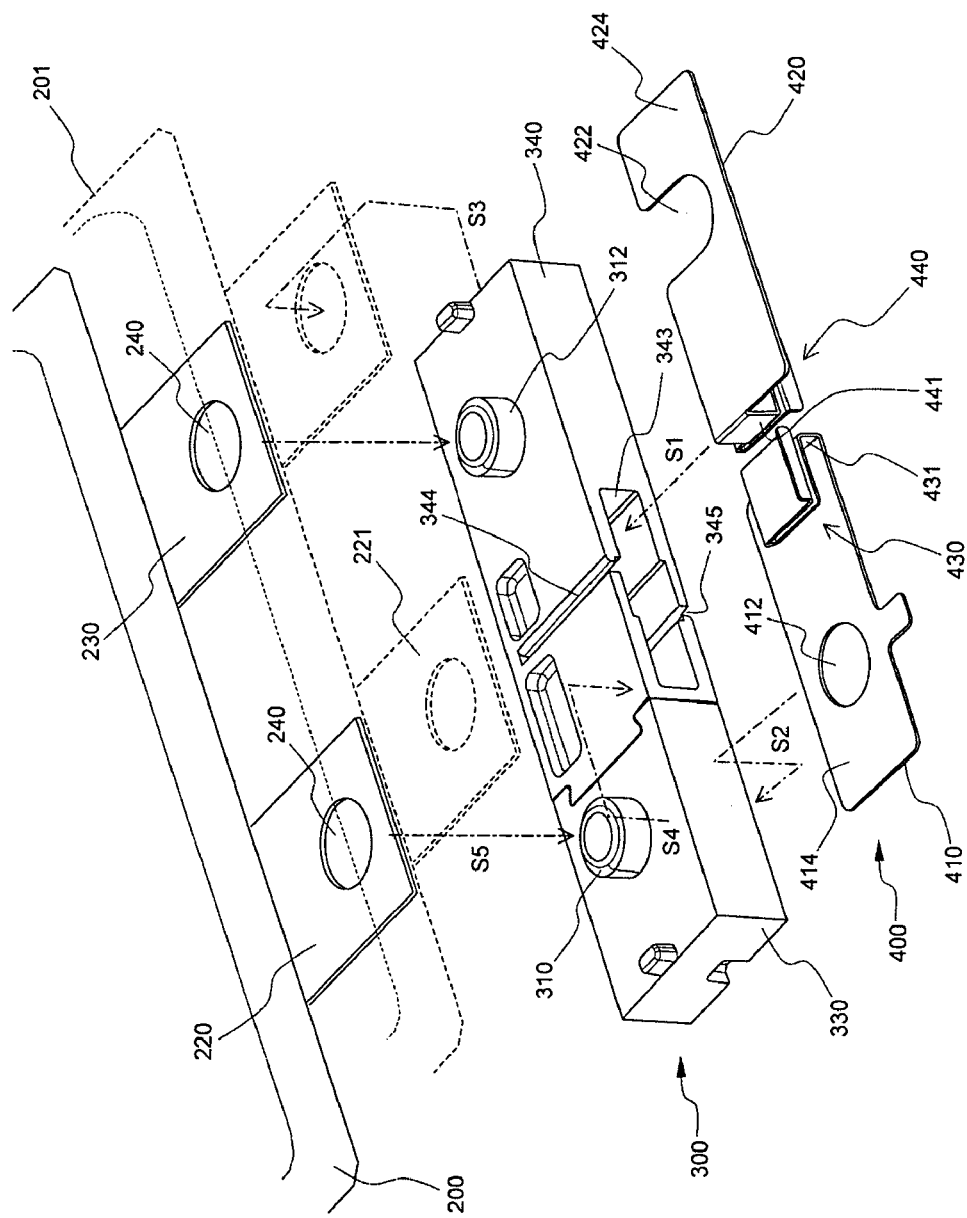
FIG. 5 is a typical view partially illustrating the connection of electrode terminals using the assembly-type insulating member shown in FIG. 3 and the separation-type connecting member shown in FIG. 4.

FIG. 5 is a typical view partially illustrating the connection of electrode terminals of the unit cells using the assembly-type insulating member shown in FIG. 3 and the separation-type connecting member shown in FIG. 4. Specifically, the connection of the unit cells 200 and 201 in series using the insulating member 300 and the connecting member 400 is illustrated in FIG. 5.

Referring to FIG. 5, the engaging parts 430 and 440 of the first and second terminal connecting bodies 410 and 420 of the connecting member are securely inserted into the hollow part 343 of the second assembly unit body 340 of the insulating member. Specifically, the engaging part 430 of the first terminal connecting body 410 is inserted into the hollow part 343 with the engaging part 430 upward, and the plate-shaped main body 414 covers the lower end surfaces of the first assembly unit body 330 and the second assembly unit body 340. When the first terminal connecting body 410 is coupled to the insulating member as described above, the side bent section 431 of the engaging part 430 is moved inward along a lower guide groove 345 formed a predetermined length at the lower end of the hollow part 343. When the engaging part 430 of the first terminal connecting body 410 is inserted into the hollow part 343 of the insulating member 300, the first terminal connecting body 410 is mounted at the lower end surface of another insulating member (not shown) having no projections. For this reason, the engaging hole 412 is formed in the closed type.

On the other hand, the engaging part 440 of the second terminal connecting body 420 is inserted into the hollow part 343 with the engaging part 440 downward, and the plate-shaped main body 424 covers the upper end surface of the second assembly unit body 340. When the second terminal connecting body 420 is coupled to the insulating member as described above, the side bent section 441 of the engaging part 440 is moved inward along an upper guide groove 344 formed a predetermined length at the upper end of the hollow part 343. When the engaging part 440 of the second terminal connecting body 420 is inserted into the hollow part 343 of the insulating member 300, the second terminal connecting body 420 is mounted at the upper end surface of the insulating member 300 having the protrusions 312. For this reason, the engaging hole 422 is formed in the open type.

The two terminal connecting bodies 410 and 420 remain separated from each other as shown in the drawing (showing the state before the coupling) even after the terminal connecting bodies 410 and 420 are coupled to the insulating member 300. The first terminal connecting body 410 is connected to a cathode terminal 221 of the unit cell 201 coupled to the lower end surface of the first assembly unit body 330, and the second terminal connecting body 420 is connected to an anode terminal 230 of the unit cell 200 coupled to the protrusion 312 of the second assembly unit body 340.

Now, the process of assembling the insulating member and the connecting member will be described.

First, the second terminal connecting body 420 is coupled to the second assembly unit body 340 (S1). Next, the first terminal connecting body 410 is coupled to the second assembly unit body 340 (S2). Subsequently, the engaging hole 422 of the second terminal connecting body 420 coupled to the second assembly unit body 340 as described above is aligned with the through-hole 240 of the anode terminal 230 of the unit cell 200 (S3). After that, the first assembly unit body 330 is coupled to the second assembly unit body 340 (S4). Finally, the unit cell 200 is mounted at the insulating member 300 such that the protrusion 310 is fitted in the through-hole 240 of the cathode terminal 220, and the protrusion 312 is fitted in the through-hole 240 of the anode terminal 230 (S5). At this time, the cathode terminal 220 is brought into contact with another first terminal connecting body (not shown) to be coupled from above while the cathode terminal 220 is coupled to the protrusion 310. On the other hand, the anode terminal 230 is brought into contact with the second terminal connecting body 420, which is coupled to the protrusion 312.

The above-described assembly process is merely an example of a possible assembly process, and the sequence of the assembly process may be partially changed. For example, the step of coupling the first assembly unit body 330 and the second assembly unit body 340 (S4) may be carried out first.

Figure 6:
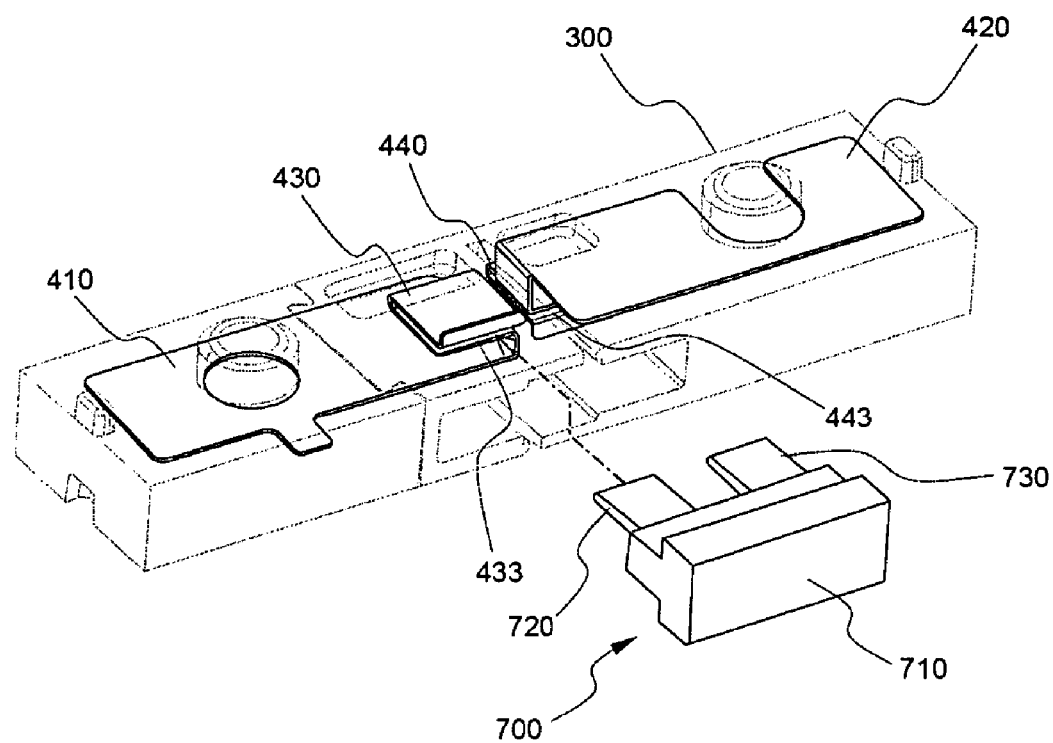
FIG. 6 is a typical view illustrating the connection of a fuse to the assembly-type insulating member and the separation-type connecting member, which are coupled with each other.

FIG. 6 is a typical view illustrating the connection of the first terminal connecting body and the second terminal connecting body with a fuse after the assembly process shown in FIG. 5 is completed.

Referring to FIG. 6, the first terminal connecting body 410 and the second terminal connecting body 420, which are coupled to the insulating member 300, are separated from each other, and therefore, first terminal connecting body 410 is not electrically connected with the second terminal connecting body 420. Consequently, after the assembly of the relevant members is completed, it is necessary to connect the terminal connecting bodies 410 and 420 with a safety element or an additional conductive element such that the electrical conduction between the terminal connecting bodies 410 and 420 is accomplished. FIG. 6 illustrates the electrical connection using a fuse 700, which is a kind of safety element.

The fuse 700 includes a fuse body 710 having a region that may break when overcurrent or overheating occurs and two connecting terminals 720 and 730 extending from the fuse body 710.

Elastic connecting grooves 433 and 443 are formed at the engaging parts 430 and 440 of the first and second terminal connecting bodies 410 and 420 while the first terminal connecting body 410 and the second terminal connecting body 420 are coupled to the insulating member 300. The connecting terminals 720 and 730 of the fuse 700 are inserted into the connecting grooves 433 and 443, whereby the electrical connection between the first terminal connecting body 410 and the second terminal connecting body 420 is accomplished. When overcurrent or overheating occurs at the corresponding unit cell (not shown), the fuse 700 is broken. In this case, the battery module is disassembled, the broken fuse 700 is removed, and a new fuse is coupled to first terminal connecting body 410 and the second terminal connecting body 420. In the case that the safety element is not necessary in the course of electrical connection as previously described, the first terminal connecting body 410 and the second terminal connecting body 420 may be formed as a single body.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the terminal-linking member of the secondary battery module according to the present invention has the effect of accomplishing easy and stable connection of the electrode terminals of the unit cells, securely stacking the unit cells without using additional mounting members, such as cartridges, reducing a possibility of short circuits during manufacturing the secondary battery module, enabling a safety element to be easily mounted during the assembly of the battery module or during the use of the completed battery module, and performing an electric potential leveling process to the unit cells.

What is claimed is:

1. A terminal-linking member of a secondary battery module having unit cells stacked one on another and electrically connected with each other, wherein the terminal-linking member comprises:
    an insulating member mounted between electrode terminals of neighboring unit cells for accomplishing electrical insulation between the electrode terminals, the insulating member being coupled to the electrode terminals; and
    a connecting member coupled to the insulating member for electrically connecting the electrode terminals of the unit cells coupled to the insulating member in series and/or in parallel with each other;
    wherein the insulating member comprises first and second assembly unit bodies configured to be removably coupled to each other, a cathode electrode terminal of a first unit cell being coupled to the first assembly unit body and anode electrode terminal of the first unit cell being coupled to the second assembly unit body, and
    wherein the first assembly unit body has a female coupling part formed at one side thereof, and the second assembly unit body has a male coupling part formed at one side thereof, the male coupling part corresponding to the female coupling part, and at least one of the first and second assembly unit bodies is provided at a side thereof with a hollow part, by which the connecting member is coupled to at least one of the first and second assembly unit bodies.

2. The terminal-linking member as set forth in claim 1, wherein the electrode terminals of the unit cells are provided with through-holes, and the insulating member is provided with coupling protrusions, which correspond to the through-holes, such that the coupling protrusions of the insulating member are fitted in the through-holes of the electrode terminals.

3. The terminal-linking member as set forth in claim 2, wherein the coupling protrusions are also provided with through-holes, such that the electrode terminals stacked while the insulating member is disposed between the electrode terminals are coupled with each other by coupling members inserted through the through-holes of the coupling protrusions.

4. The terminal-linking member as set forth in claim 1, wherein the insulating member is constructed in the shape of a rectangular block, which conforms to a gap between the electrode terminals of the stacked unit cells.

5. The terminal-linking member as set forth in claim 1,
    wherein the connecting member comprises:
    a first terminal connecting body connected to the cathode electrode terminal of a first unit cell; and
    a second terminal connecting body connected to the anode electrode terminal of a second unit cell, which is adjacent to the first unit cell, and
    wherein the connecting member is coupled to the insulating member in such a manner that the connecting member is inserted into hollow parts formed at the insulating member.

6. The terminal-linking member as set forth in claim 5, wherein
    the first terminal connecting body and the second terminal connecting body are separated from each other,
    the first terminal connecting body and the second terminal connecting body are coupled to the insulating member such that the first and second terminal connecting bodies are connected to the corresponding electrode terminals, and the first terminal connecting body and the second terminal connecting body are connected with each other by a conductive member for accomplishing the electrical connection between the first terminal connecting body and the second terminal connecting body after the first and second terminal connecting bodies are coupled to the insulating member.

7. The terminal-linking member as set forth in claim 6, wherein the conductive member is a safety element selected from the group consisting of a fuse, a bimetal, and a positive temperature coefficient (PTC) element.

8. The terminal-linking member as set forth in claim 1, wherein the first and second assembly unit bodies are further provided at middle parts of upper ends thereof with protrusions, which are fitted in through-holes of the electrode terminals of the unit cell.

9. The terminal-linking member as set forth in claim 1, wherein
the first and second assembly unit bodies are provided at the side parts of upper ends thereof with coupling protrusions, by which the first and second assembly unit bodies are coupled with another insulating member stacked on the first and second assembly unit bodies, and the first and second assembly unit bodies are provided at lower end surfaces thereof with coupling grooves, which correspond to the coupling protrusions.

10. The terminal-linking member as set forth in claim 5, wherein the first and second terminal connecting bodies have engaging holes, in which protrusions of the insulating member are fitted, and engaging parts, which are securely inserted into the hollow part of the insulating member.

11. The terminal-linking member as set forth in claim 10, wherein one of the engaging holes is constructed in a closed type, and the other engaging hole is constructed in an open type.

12. The terminal-linking member as set forth in claim 10, wherein each of the engaging parts includes:
 a first bent section formed by bending inwardly a main body, which is made of a plate-shaped material, at a predetermined height; and
 a second bent section formed by vertically bending the first bent section.

13. A secondary battery module including a terminal-linking member as set forth in claim 1.

* * * * *

UNITED STATES PATENT AND TRADEMARK OFFICE
CERTIFICATE OF CORRECTION

| | |
|---|---|
| PATENT NO. | : 7,638,237 B2 |
| APPLICATION NO. | : 11/317872 |
| DATED | : December 29, 2009 |
| INVENTOR(S) | : Ha et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Ninth Day of November, 2010

David J. Kappos
*Director of the United States Patent and Trademark Office*